(No Model.) 6 Sheets—Sheet 2.
A. BLEICHERT.
GRIPPING DEVICE FOR SUSPENDED CABLE OR ROPE RAILWAYS.
No. 590,957. Patented Oct. 5, 1897.
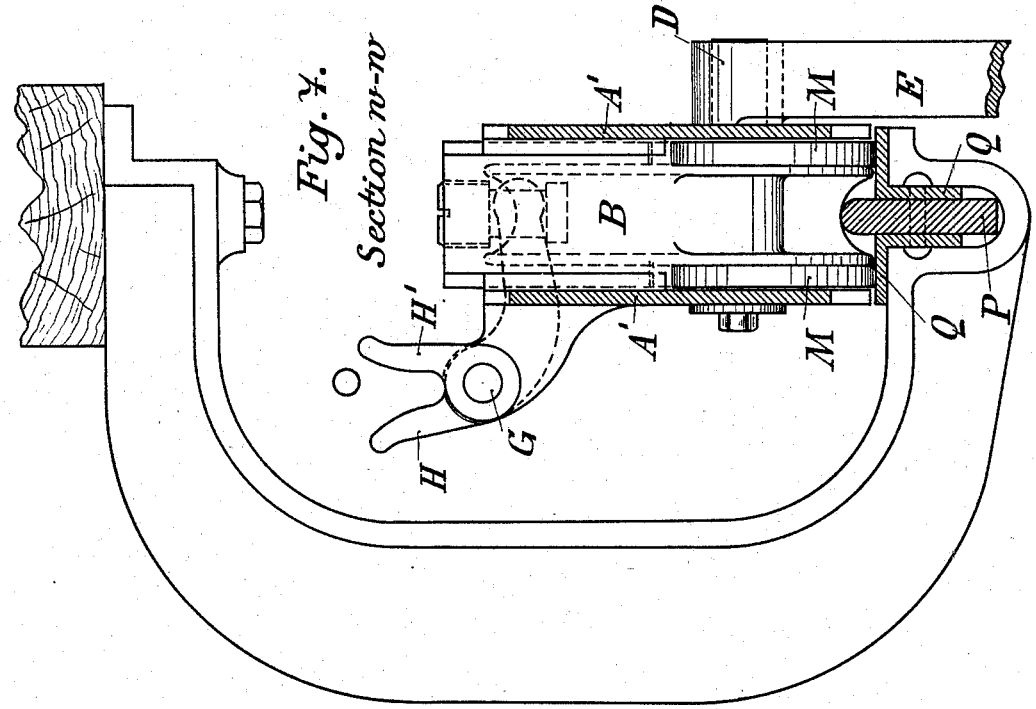
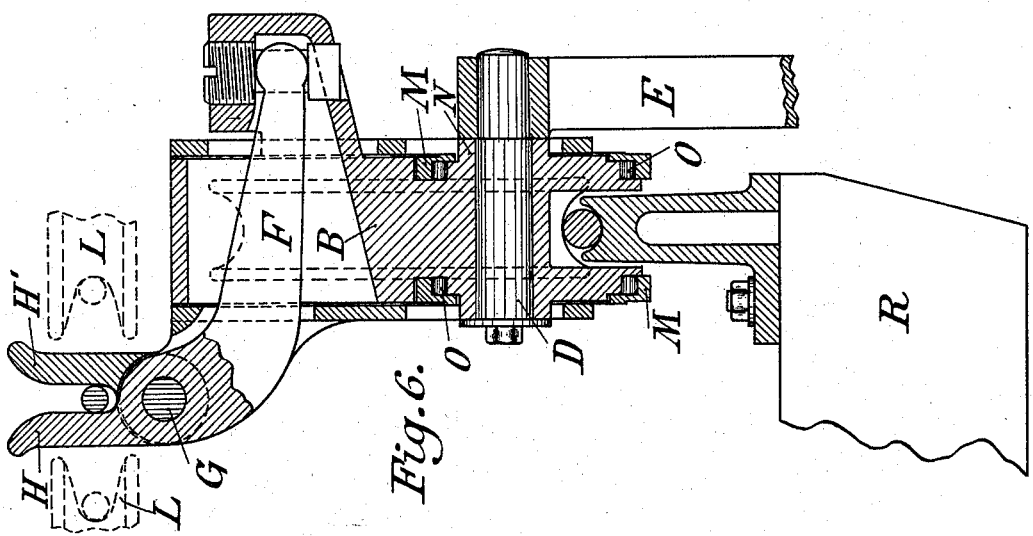
WITNESSES:
C. Holloway
William Rigby
INVENTOR:
Adolf Bleichert
BY ATTORNEY:

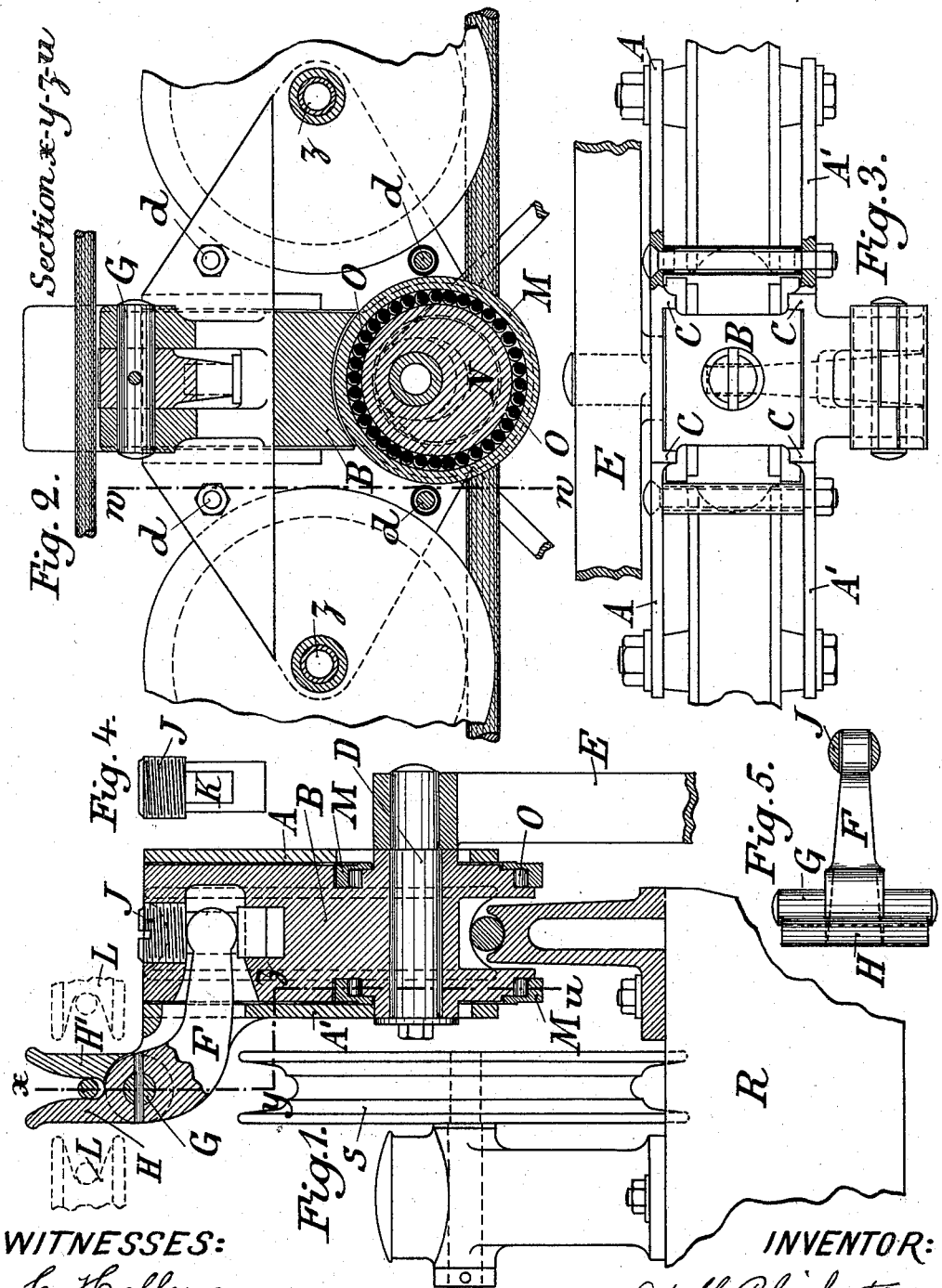

(No Model.) 6 Sheets—Sheet 3.

A. BLEICHERT.
GRIPPING DEVICE FOR SUSPENDED CABLE OR ROPE RAILWAYS.

No. 590,957. Patented Oct. 5, 1897.

WITNESSES:
C. Holloway
William Rigby

INVENTOR:
Adolf Bleichert
BY ATTORNEY:

(No Model.) 6 Sheets—Sheet 4.
A. BLEICHERT.
GRIPPING DEVICE FOR SUSPENDED CABLE OR ROPE RAILWAYS.
No. 590,957. Patented Oct. 5, 1897.
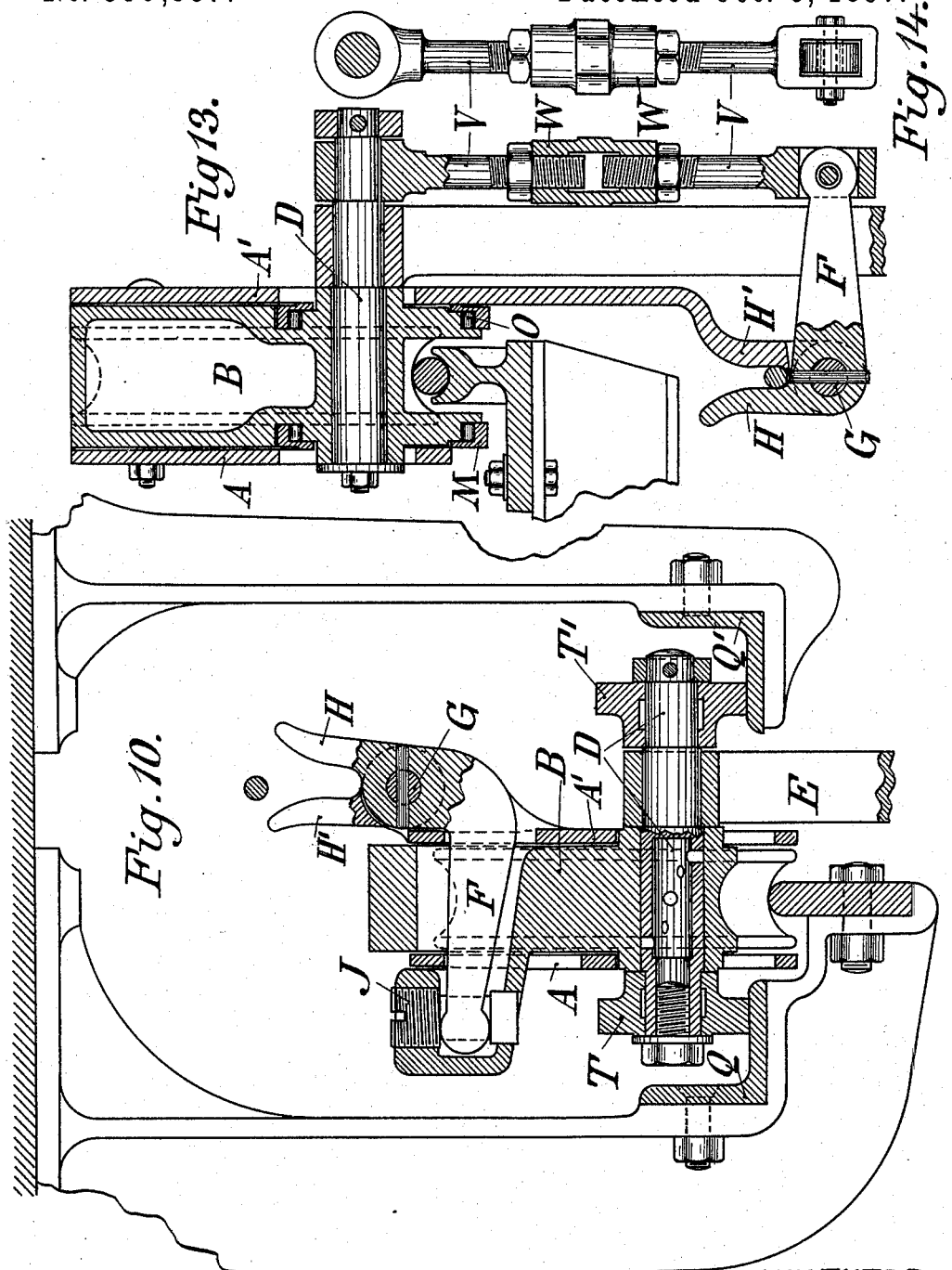
WITNESSES:
C. Holloway
William Rigby
INVENTOR:
Adolf Bleichert
BY ATTORNEY:

(No Model.) 6 Sheets—Sheet 5.
A. BLEICHERT.
GRIPPING DEVICE FOR SUSPENDED CABLE OR ROPE RAILWAYS.
No. 590,957. Patented Oct. 5, 1897.
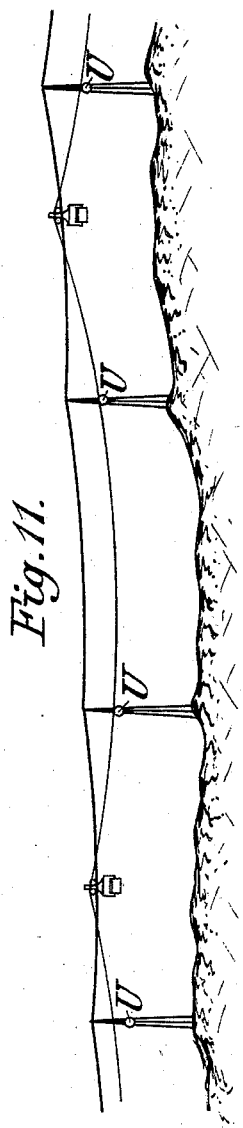
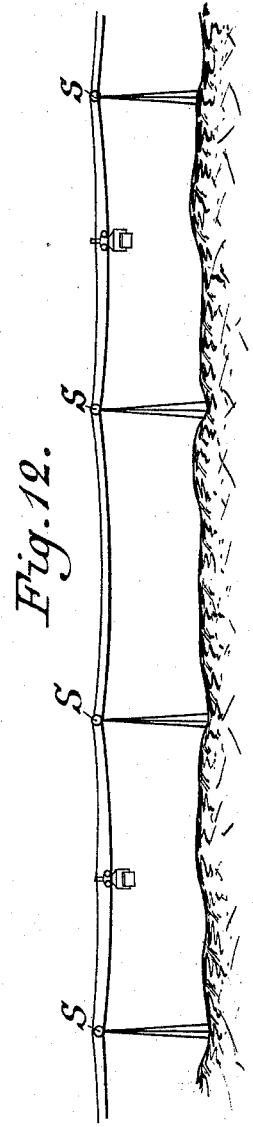
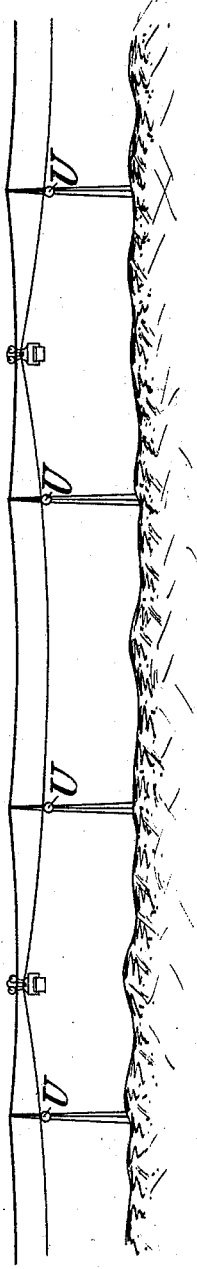
WITNESSES:
C. Holloway
William Rigby
INVENTOR:
Adolf Bleichert
BY ATTORNEY:

(No Model.) 6 Sheets—Sheet 6.
A. BLEICHERT.
GRIPPING DEVICE FOR SUSPENDED CABLE OR ROPE RAILWAYS.
No. 590,957. Patented Oct. 5, 1897.
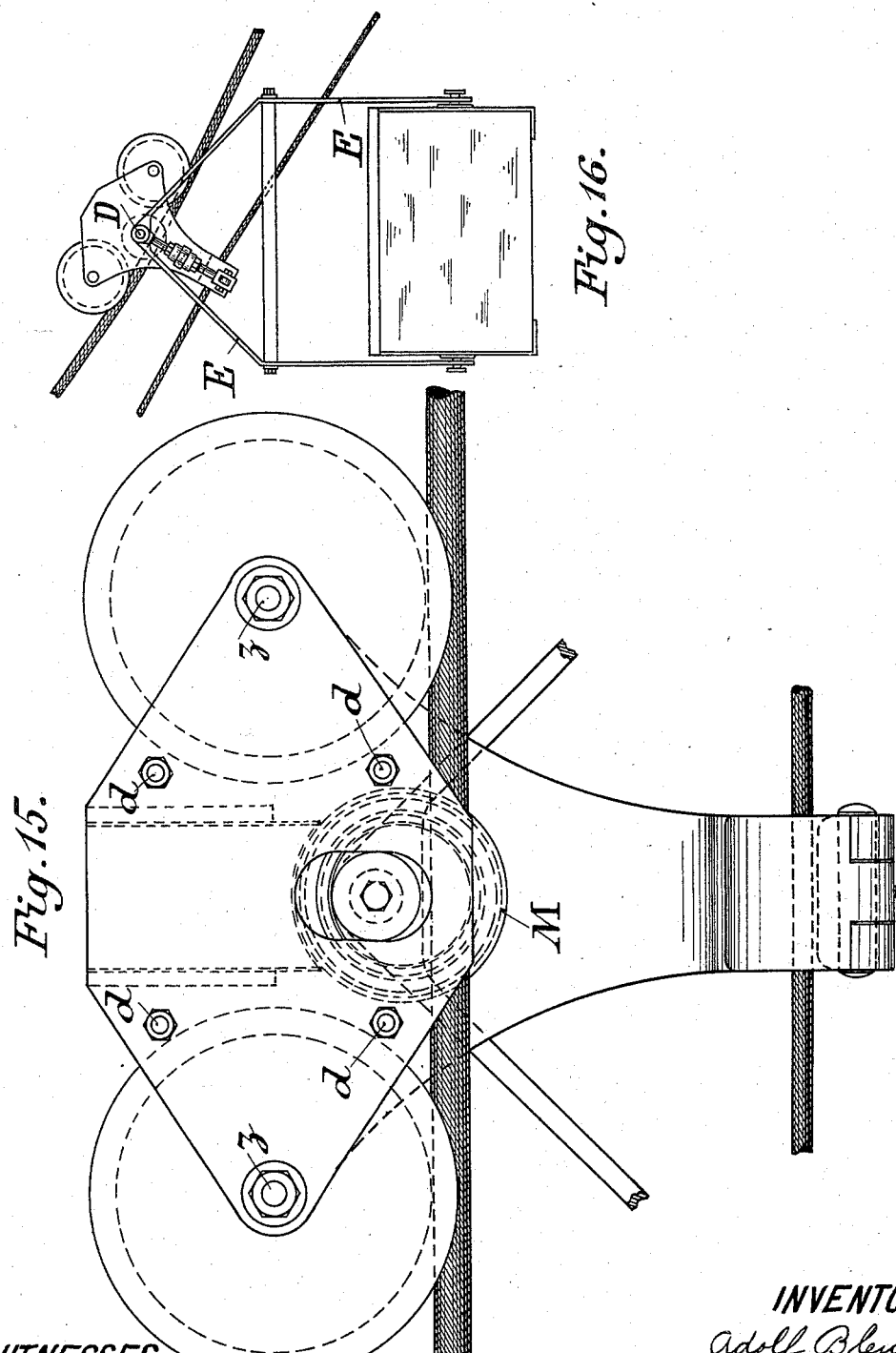
WITNESSES:
E Hollaway
William Rigley
INVENTOR:
Adolf Bleichert
BY ATTORNEY:

UNITED STATES PATENT OFFICE.

ADOLF BLEICHERT, OF LEIPSIC-GOHLIS, GERMANY.

GRIPPING DEVICE FOR SUSPENDED CABLE OR ROPE RAILWAYS.

SPECIFICATION forming part of Letters Patent No. 590,957, dated October 5, 1897.

Application filed October 30, 1896. Serial No. 610,559. (No model.)

*To all whom it may concern:*

Be it known that I, ADOLF BLEICHERT, a subject of the Emperor of Germany, residing at Leipsic-Gohlis, in the Empire of Germany, have invented certain new and useful Improvements in Gripping Devices for Suspended Cable or Rope Railways, of which the following is a specification, reference being had to the accompanying drawings.

Figure 8:
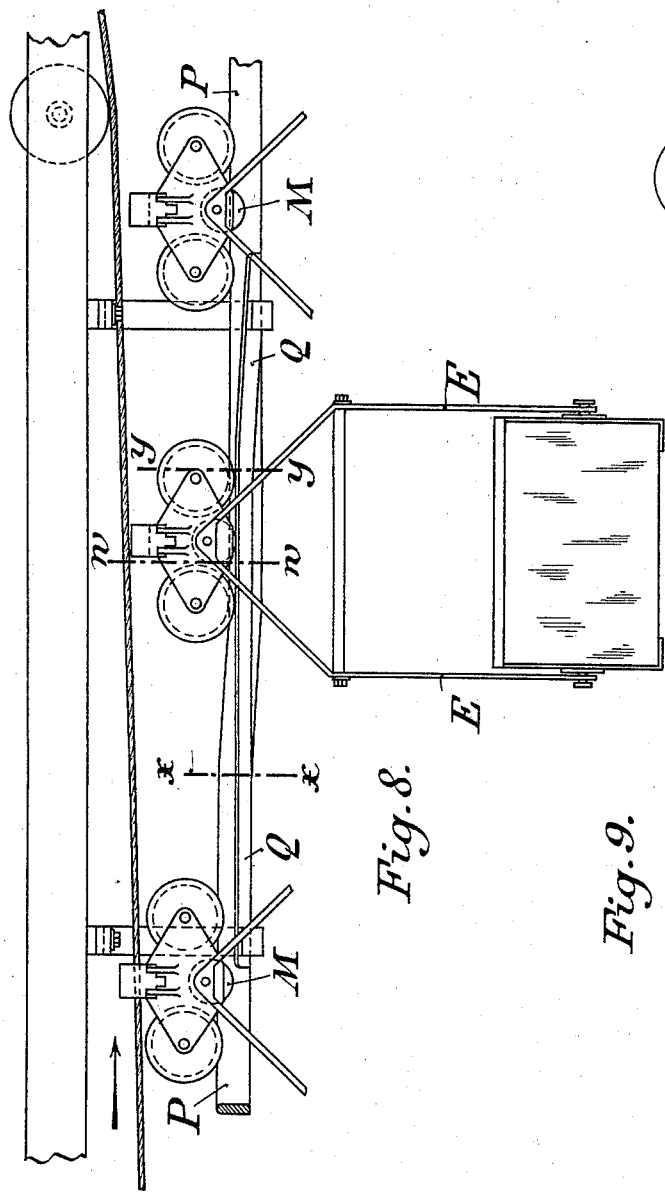
Figure 9:
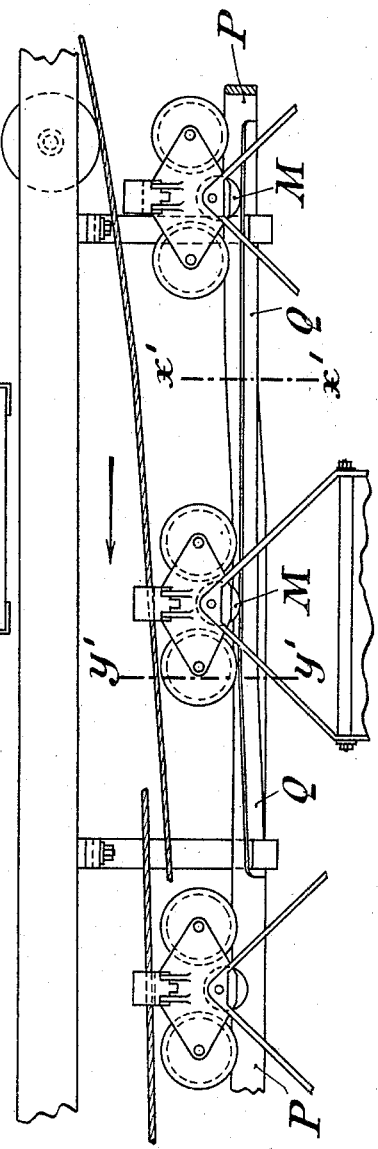

In the drawings, Figure 1 is a cross-sectional view of an apparatus embodying my invention. Fig. 2 is a section on the line $x\,y\,z\,u$ of Fig. 1. Fig. 3 is a plan view of the same. Figs. 4 and 5 are detail views of parts of Fig. 1 hereinafter referred to. Fig. 6 is a cross-sectional view of a modified form of gripping-machine. Fig. 7 is a section on the line $w\,w$ of Fig. 2. Fig. 8 is a side view of the carriage on the suspended rail at the station. Fig. 9 is a similar view. Fig. 10 is a cross-sectional view of another embodiment of the coupling mechanism. Figs. 11 and 12 are diagrammatic elevations showing different positions of the traction-cables. Fig. 13 is a cross-sectional view of a third embodiment of the coupling mechanism. Fig. 14 is an end view of a portion of Fig. 13. Fig. 15 is a side view, looking from the left, of Fig. 13. Fig. 16 is a side elevation of the cable-railway carriage equipped with that embodiment of coupling mechanism shown in Figs. 13, 14, and 15; and Fig. 17 is a diagrammatic elevation of a section of the cable-railway line hereinafter referred to.

Coupling arrangements for locking cable-railway carriages or cars by coupling them to the traction-cable are not unknown, the arrangements of that class which have hitherto been introduced being devised on the principle that the locking or gripping cheeks or jaws are compressed by the weight of the load, the weight of the vehicle acting upon the jaws direct. The compressing or gripping effect thus produced is so slight, however, that somewhat steep gradients cannot thereby be overcome; nay, that even along a substantially horizontal road having no other slopes or inclines but those formed by the curves or bendings of the supporting-cable those arrangements prove ineffective.

Now the subject of this invention is a coupling device for wire-cable railways wherein the weight of the carriage is transferred to the gripping or locking cheeks through the medium of levers, screws, wedges, or the like in such a manner that the pressure produced represents a multiple of the weight of the carriage, owing to which arrangement the required coupling may be effectively carried out on slopes or gradients of no matter what angle of inclination.

The accompanying drawings represent several different forms or modifications of apparatus in which this invention is embodied.

The rolling mechanism of the carriage consists of the two side frames or cheeks A A', held together by spacing rods or bolts $d\,d$ and carrying pivots or axles $z\,z$, whereon are mounted the wheels at their ends.

Between the side frames or cheeks A A' there is located a sliding body B, which is guided in the vertical direction by the guide-rails C C, secured to the said cheeks A A'. The sliding body B, at its lower end, carries a suspension-bolt or rod D for the suspended frame E, which supports the body of the vehicle, while at the upper end of the sliding body B is situated the point of engagement for the longer arm of a double-armed lever F, pivoted at G, acting not unlike tongs, the shorter arm of which, assuming the shape of a gripping-jaw H, Figs. 1 and 5, is pressed against a second similar gripping-jaw H', rigidly attached to the cheek or side piece of the rolling mechanism of the car, so that the traction-cable extending through the pair of gripping-jaws is adapted to be tightly compressed between them. The point or part at which the sliding body B is to actuate the double-armed lever F is regulated by a set-screw J. This screw has a recess or notch at K, Figs. 1 and 4, of suitable shape for the reception of one of the arms of the double-armed lever. By raising or lowering this adjusting screw J the situation of the point of action or operation of the said double-armed lever may be varied, the space between the gripping-jaws being reduced or enlarged accordingly, so as to suit the diameter of the traction-cable.

In the apparatus, of which Fig. 1 is a cross-section, the transmission of the strain or pressure from the point of engagement of the sliding body B or from the set-screw J on the double-armed or tong-shaped lever F to the gripping-jaw H is supposed to take place at the ratio of 1:3, so that, assuming the carriage to weigh, say, five hundred kilograms, the traction-cable will be gripped at a pressure or weight of $3 \times 500 = 1,500$ kilograms. Now if with a greased cable the coefficient of friction be set down at .1, then the cable on being gripped or locked, as stated, will withstand a "pull" of one hundred and fifty kilograms, or, in other words, the vehicle weighing five hundred kilograms will be fit (if provided with the present coupling device) to be used for gradients $\frac{500}{150} = 1:3\frac{1}{3}$.

Fig. 6 shows a modification of this apparatus, in which this transmission of lever action may be expressed as 1:5. In this case, taking the weight of the vehicle to be also five hundred kilograms, the cable will be gripped at a weight or strain of two thousand five hundred kilograms, so that this carriage might travel over gradients of $\frac{500}{250} = 1:2$ without any slipping of the traction-cable in the gripping-jaws being likely to occur. Hence it follows that this coupling mechanism may be employed with absolute safety on the steepest inclines ever occurring in practice, provided their ratio of transmission or pressure between the sliding body or support B, sustaining the weight of the carriage, and the gripping-jaws H H' is predetermined or adjusted accordingly.

One particularly important feature may be here called attention to in connection with the apparatus illustrated in Figs. 1 to 6 of the accompanying drawings, and that is that the gripping-jaws H H' are situated entirely above the rolling mechanism. A carriage provided with this coupling apparatus may therefore travel along the track-line over curves of no matter what dimensions or amplitude in a perfectly automatic manner and without its being necessary to loosen or detach it from the traction-cable. As illustrated in Figs. 1 and 6, there are provided for this purpose above the vehicle without the gripping-jaws H H' horizontal guiding-rollers L for the traction-cable, so that as the vehicle moves past the said gripping-jaws locate themselves against or in contact with those rollers. According as the curve to be described by the carriage in motion is a concave or convex one these guide-rollers L should be arranged either on one or the other side of the gripping-jaw. It will be understood, moreover, that the position of the supporting-cable or the guiding-rail along or against which the carriages run must also at such places exactly correspond to the direction of the curve followed by the traction-cable under the guidance of the guide-rollers L.

The means for opening and closing the gripping-jaws H H', acting like tongs, or for throwing them or the carriage in and out of gear with the traction-cable, consist of the guiding-rings M, situated at the lower end of the sliding body and on either side of the same and adapted to turn about correspondingly-rounded projections N on the sliding body or support B and to move along a number of steel rollers O O, (this for the purpose of rendering them more readily movable,) such steel rollers being interposed between the rings M and the round projections N, Figs. 1, 2, and 6. Upon entering a station the cable-railway carriage takes up its position upon a suspended rail P, connected with the supporting-cables by means of tongues, Figs. 7 and 8. On both sides of this suspended rail there are arranged angle-iron rails Q Q, whereon at a given moment the guiding-rings M, and also consequently the sliding body B, with the carriage suspended from it, find their support. The vehicle reaches a point $x$, Fig. 8, where the suspended rail P descends, while the two angle-iron rails Q retain their horizontal position. The vehicle accordingly descends the slight gradient formed by the said suspended rail P, the guiding-rings M locate themselves and press upon the angle-iron rails Q, and the sliding body B, with the carriage suspended therefrom, is successively or gradually raised, thereby releasing the gripping-jaws. In this position the traction-cable is lifted out of engagement with the gripping-jaws and the carriage becomes entirely free. From a certain point $y$ the angle-iron rails Q Q will now descend or be depressed, while the suspended rail P of the suspension-line continues to extend horizontally. Hence it follows that the sliding body B, together with the carriage, descends to its lowest position, the gripping-jaws close again, and the carriage is now conducted along the rails of the suspended line at the station up to the spot where the charging and discharging take place, after which it reaches the starting-point leading to the other supporting-cable.

The operation just described is illustrated in Fig. 9. The carriage arrives as indicated by the arrow. At the point $x'$ the suspended rail P of the suspension-line is lowered. The guide-rings M take up their positions upon the horizontal angle-iron rails Q Q, whereby the sliding support or frame B is raised, together with the carriage, and the gripping-jaws are opened. In this position the traction-cable is inserted between the gripping-jaws from the top. The carriage now reaches the position $y'$, whence the angle-iron rails Q Q begin to be lowered, thereby causing also the sliding frame B to descend, the consequence being that the gripping-jaws are closed. At this juncture the carriage is firmly coupled with the traction-cable and now, being pulled by this cable, takes up its position upon the supporting-cable. The whole process of coupling the vehicle in and out of engagement with the traction-cable thus takes place automatically, as the foregoing part of the specification clearly explains. The attendant at the station has merely to receive the carriage as it enters the station and after having loaded or unloaded it, as the case may be, to move it to the other supporting-cable, taking no heed of anything else.

Figs. 1 and 6 are cross-sections of the gripping-jaws H H' when in gear—that is to say, with the traction-cable gripped or locked in position—whereas Fig. 7 represents the apparatus with the gripping-jaws open or out of gear and with the sliding frame B raised by the action of the guiding-rings M.

Fig. 10 represents another modification of this coupling device, wherein the gripping-jaws H H' are situated on the opposite side of the rolling mechanism of the vehicle, the consequence being that the traction-cable, when in operation, assumes a lower position (shown in Fig. 11) upon the free portion of the track or line, being supported by guide-rollers U, as shown in said view, whereas in the forms of apparatus represented in Figs. 1, 6, and 7 the traction-cable is supported by the guide-rollers S, provided upon the carriers R of the supporting-structure, as illustrated in Figs. 1 and 12.

In order to open and close the gripping-jaws H H', or, in other words, to throw them in and out of gear, rollers T T' are provided at both ends of the suspension-rod D, as shown in Fig. 10. These rollers, at the stations, rest on the angle-iron rails Q Q', as already explained, and as illustrated in Figs. 8 and 9, whereby the sliding frame B, together with its suspension-rod D and the carriage suspended therefrom, is raised, releasing or opening the gripping-jaws.

Figs. 13 to 17 represent a form of this improved coupling apparatus, in which the gripping-jaws H H' are located below the supporting-cable and are coaxial with the vertical axis of the same. Between the two cheeks or side pieces of the rolling mechanism A A' there is here also a sliding body B, which carries the guiding-rings M M at its lower end, which rings serve for engaging and releasing the gripping-jaws H H', acting like tongs, as before stated. One of the said cheeks A' is extended downwardly and terminates at its lower end in a gripping-jaw H' with a hinge for the pivot or bolt G, on which the double-armed lever F is adapted to turn, which lever presses with its shorter arm, formed in the shape of a gripping-jaw H, against the other stationary gripping-jaw H', thereby locking the traction-cable in position. The connection of the suspension-rod D with the double-armed leader F is formed by a bar or rod V, which transmits the weight of the carriage, suspended from the said rod D, direct to the said double-armed lever F and also therefore to the gripping-jaws H H'. The rod V consists of two parts connected by a nut W, tapped with a right and left screw-thread, whereby, according to the diameter of the traction-cable, the space between the gripping-jaws H H' may be increased or decreased.

Fig. 16 represents a cable-railway carriage fitted with a coupling arrangement such as this and supposed to be moving along a sloping track inclined at an angle of about thirty degrees. The carriage suspended from the rod D occupies, as shown, a perfectly vertical position, whereas the rolling mechanism thereof, together with the coupling mechanism directly connected therewith, is in an oblique position corresponding to the inclination of the supporting-cable.

Fig. 17 represents the free section of the cable-railway line where the carriages are used with the last-described coupling device. The traction-cable in this arrangement therefore is situated entirely below the supporting-cables and, save to the extent to which it is carried by the vehicle itself, it is supported by the guide-rollers attached to the supports or stays.

Instead of lever transmission such as is herein described, transmission gearing consisting of screws, wedges, or the like may be employed.

What I claim is—

1. In suspended cable or rope railways, the combination with the framework of the rolling mechanism of the vehicle, of a sliding body guided by said framework and supporting the vehicle, a pivoted lever one arm of which engages with said sliding body and the other arm terminates in a gripping-jaw, a stationary gripping-jaw coacting with the gripping-jaw of the lever, and a traction-cable adapted to be locked between said jaws.

2. The combination with the framework of the rolling mechanism of the vehicle, of a sliding body guided by said framework and supporting the vehicle, a pivoted lever one arm of which engages with said sliding body and the other arm terminates in a gripping-jaw, a stationary gripping-jaw coacting with the gripping-jaw of the lever, a traction-cable adapted to be locked between said jaws, and means whereby the gripping-jaws may be adjusted according to the varying thicknesses of the cable.

3. The combination with the framework of the rolling mechanism of the vehicle, of a sliding body guided by said framework and supporting the vehicle, a pivoted lever one arm of which engages with said sliding body and the other arm terminates in a gripping-jaw, a stationary gripping-jaw coacting with the gripping-jaw of the lever, a traction-cable adapted to be locked between said jaws, and a set-screw for adjusting the gripping-jaws.

4. The combination with the framework of the rolling mechanism of the vehicle, of a sliding body guided by said framework and supporting the vehicle, a pivoted lever one arm of which engages with said sliding body and the other arm terminates in a gripping-jaw, a stationary gripping-jaw coacting with the gripping-jaw of the lever, a traction-cable adapted to be locked between said jaws, and a set-screw arranged in said sliding body and having a recess to receive the arm of said lever, whereby the point of action or operation of said lever may be varied by adjusting said screw.

5. The combination with the framework of the rolling mechanism of the vehicle, of coupling mechanism for locking the vehicle to the traction-cable, a sliding body for carrying the same, the gripping appliances of said coupling mechanism located above the rolling frame, a rail for supporting the rolling frame and rails for intermittently taking the weight of such sliding body.

6. The combination with the framework of the rolling mechanism of the vehicle, of a sliding body guided by said framework and carrying at its lower end a bolt or rod from which the vehicle is suspended, a pivoted lever one arm of which engages with said sliding body and the other arm terminates in a gripping-jaw, a stationary gripping-jaw coacting with the gripping-jaw of the lever and a traction-cable adapted to be locked between said jaws.

7. The combination with the framework of the rolling mechanism of the vehicle, of a sliding body guided by said framework and supporting the vehicle, rails Q adapted to support said sliding body, a pivoted lever one arm of which engages with said sliding body and the other arm terminates in a gripping-jaw, a stationary gripping-jaw coacting with the gripping-jaw of the lever, a traction-cable adapted to be locked between said jaws, and appliances connected to said sliding body at its lower end and serving to raise or lower said body by means of rails Q as the vehicle enters or departs from the station thus automatically throwing the gripping-jaws into or out of engagement with the traction-cable.

8. The combination with the framework of the rolling mechanism of the vehicle, of a sliding body guided by said framework and supporting the vehicle, a pivoted lever one arm of which engages with said sliding body and the other arm terminates in a gripping-jaw, a stationary gripping-jaw coacting with the gripping-jaw of the lever, a traction-cable adapted to be locked between the said jaws, and guiding-rings at the lower end of said sliding body, substantially as set forth.

9. The combination with the framework of the rolling mechanism of the vehicle, of a sliding body guided by said framework and supporting the vehicle, a pivoted lever the short arm of which terminates in a jaw at that side of the frame opposite that at which the rolling mechanism travels, a stationary jaw secured to the framework in suitable relation to the jaw of said lever, a traction-cable adapted to be locked between said jaws, and rollers U for supporting said cable at the free portions of the line, substantially as set forth.

In testimony whereof I have hereunto set my hand this 14th day of October, 1896.

ADOLF BLEICHERT.

Witnesses:
RUDOLPH FRICKE,
CONRAD BAUM.